United States Patent [19]
Rosenberry, Jr.

[11] 3,894,274
[45] July 8, 1975

[54] ELECTRIC MOTOR TRANSIENT VOLTAGE SUPPRESSING CIRCUIT

[75] Inventor: George Mowry Rosenberry, Jr., Elnora, N.Y.

[73] Assignee: General Electric Company, Schenectady, N.Y.

[22] Filed: July 1, 1974

[21] Appl. No.: 485,056

[52] U.S. Cl. ............ 317/13 R; 317/16; 317/31; 317/41; 317/50; 317/61.5
[51] Int. Cl. ............................................. H02h 7/09
[58] Field of Search ............ 317/13 R, 16, 31, 40 R, 317/41, 50, 68, 61.5

[56] References Cited
UNITED STATES PATENTS

| | | | |
|---|---|---|---|
| 1,093,477 | 4/1914 | Rudenberg | 317/61.5 X |
| 2,246,926 | 6/1941 | Roman | 317/61.5 X |
| 3,258,646 | 6/1966 | Fowler | 317/13 R |
| 3,688,157 | 8/1972 | Spears | 317/13 R |

*Primary Examiner*—James D. Trammell
*Attorney, Agent, or Firm*—Vale P. Myles

[57] ABSTRACT

An electric power distribution system or an electric device, such as a motor, having a relatively low voltage class of insulation on the conductors or windings thereof is provided with a transient voltage suppressing circuit that is operable to prevent undesirable voltage peaks from being applied to the insulation. Due to the voltage distributing and stabilizing effect of the suppressing circuit, the heat dissipating characteristics of motor windings, combined with the circuit, may be improved and the long-term insulation life of the motor is thereby made more reliable.

7 Claims, 2 Drawing Figures

ELECTRIC MOTOR TRANSIENT VOLTAGE SUPPRESSING CIRCUIT

Cross-Reference to a Related Application

The voltage suppressing circuit disclosed herein may be embodied in a unitary varistor device comprising a body of sintered metal oxides such as that disclosed in a simultaneously filed U.S. Pat. application, Ser. No. 484,923 filed on July 1, 1974.

Background of the Invention

The use of voltage responsive non-linear resistance electrical valves, or so-called varistors, to suppress transient voltages is generally well-known in the prior art. Likewise, numerous different types of varistor materials and device configurations are known. Some examples of such devices and the application of them in transient voltage surge suppressing circuits of various types is disclosed in U.S. Pat. No. 3,693,053 Anderson, which issued on Sept. 19, 1972 and is assigned to the assignee of the present invention. The type of sintered metal oxide material disclosed in that patent for forming bodies of varistors has been found to produce varistors having desirably sharp cut-off voltage characteristics that make them ideally suited for transient voltage surge suppressing circuits. Accordingly, varistors formed of such sintered metal oxide materials may be used in practicing the teaching of the present invention. Toward that end, the disclosure of U.S. Pat. No. 3,693,053 is incorporated herein by reference. As the disclosure of the present invention proceeds herein, it will be apparent that the invention is not limited to a particular composition of varistor material or to given shapes or configurations of individual varistor devices. Instead, the present invention is directed primarily to the combination of advantageous surge suppressing circuit configurations with electric motor windings.

It is desirable in the design of transient voltage suppressing circuits for electric distribution systems generally and for electric devices such as motors, particularly to provide surge voltage relief means, that will maintain the voltage protection level at its lowest practical value in relation to a pre-determined normal line voltage. At the same time, it is advantageous from a cost standpoint to employ varistors or other surge suppressing devices having relatively low voltage and current ratings so that the unit cost of these system components is no excessive. Of course, cost considerations also require the number of varistors used in a given surge suppression circuit to be kept as low as possible without impairing the desired operating characteristics of the circuit. In known prior art voltage suppressing circuits applicable to electric motors, such as those shown in the above-referenced Anderson U.S. Pat. No. 3,693,053, it is conventional practice to employ circuit configurations that require varistors to have a voltage rating equivalent to the line-to-line voltage of a protected device or system. Moreover, in transient voltage suppression circuits for polyphase systems, as also shown in that patent, it is common practice to provide for line-to-line and line-to-ground protection by providing a number of individual varistors equivalent to twice the number of phases being protected. Typically, in such arrangements, one varistor is connected between respective pairs of each of the lines of the system and additional varistors are connected respectively between the line terminals and ground. Such circuit arrangements have been found to be effective in affording desired levels of voltage stability; however, as will be seen from the following disclosure of the present invention, more economical circuit arrangements are available to accomplish substantially the same degree of surge suppression.

Accordingly, it is an object of the present invention to provide an electric distribution system or electrical apparatus with a transient voltage surge suppressing circuit that is more economical to construct and operate than known prior art circuits that afford equivalent protective functions.

Another object of the invention is to provide a transient voltage suppression circuit for apparatus such as electric motors in which the protective level of a motor winding is clamped sufficiently close to the normal line voltage of the motor to enable use of thinner and lower voltage winding insulation than has heretofore been practical.

Yet another object of the invention is to provide a transient voltage surge suppressing circuit for a power system of the windings of an electrical apparatus such as a motor having a configuration of varistors, which circuit is effective to reduce the peak voltage applied to any given varistor.

Still another object of the invention is to provide an electric system, having N terminals that are to be protected from voltage surges, with a transient voltage suppressing circuit comprising (N plus 1) varistors that are electrically connected to provide line-to-line and line-to-ground transient voltage suppressing protection for the system.

Additional objects and advantages of the invention will be apparent to those skilled in the art from the description of it that follows, taken in conjunction with the accompanying drawings.

Summary of the Invention

In a preferred embodiment of the invention, a polyphase electric motor is provided with a transient voltage suppressing circuit comprising a plurality of varistors that are equal in number to the number of phase winding terminals to be protected in the motor plus 1. The varistors are electrically connected to terminals of the motor to provide both line-to-line and line-to-ground surge voltage protection. The suppressing circuit of the invention is effective to maintain the protective level of the motor winding sufficiently close to the rated voltage of the motor so that a lower rating of winding insulation may be used than was practical with prior art transient voltage suppressing circuits. In addition, the long-term voltage stability of the suppressing circuit is improved relative to equivalent prior art circuits because both the normal voltages and peak voltages applied across the varistors therein are maintained at about half the voltage normally applied to varistors in such functionally equivalent prior art circuits. In other applications of the transient suppressing circuit of the invention, it may be connected to protect a single phase systems and other types of electrical equipment.

Description of the Preferred Embodiments

Figure 1:
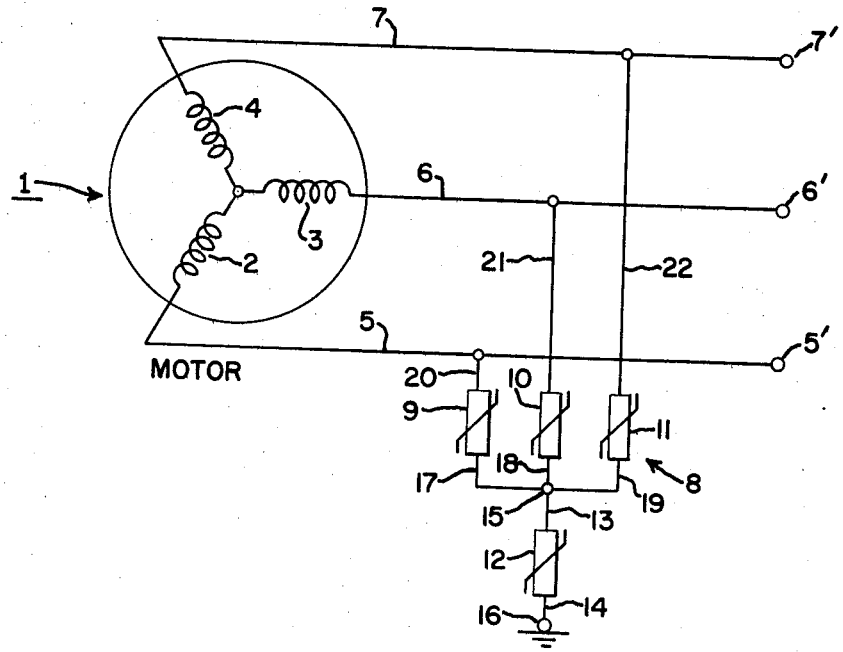
FIG. 1 is a schematic circuit diagram of a polyphase electric motor provided with a transient voltage suppressing circuit constructed pursuant to the teaching of the present invention.

In order to facilitate a description of the invention, some preferred applications of it will be discussed with reference to the drawing. It should be understood at the outset, however, that the circuit of the invention is widely applicable and may be used to protect various types of single and polyphase electric systems and devices. Referring to FIG. 1 of the drawings, it will be seen that there is shown schematically a polyphase electric motor 1 having three phase windings 2, 3 and 4 that are electrically connected in a conventional wye circuit configuration. The windings are electrically connected, respectively, by the conductors 5, 6 and 7 to line terminals 5', 6' and 7'. In the illustrated embodiment, the common terminal of the wye connected windings is shown as being ungrounded, but as the description of the suppressing circuit of the invention proceeds, it will be recognized that various embodiments of it may be applied to protect either an ungrounded system or a power distribution system, for example, that may have a grounded neutral. A transient voltage suppressing circuit constructed pursuant to the invention is generally designated in FIG. 1 by the number 8 and specifically comprises a plurality of commercially available metal oxides varistors 9, 10 and 11, that are electrically connected in a star configuration, in combination with a common varistor 12 electrically connected in series by a pair of conductors 13 and 14 between a common connection 15 of the star configuration and an electrical ground terminal 16.

As shown in FIG. 1, each of the star-connected varistors 9–11 is provided with a pair of electrical leads that may, like the varistors, be formed in any conventional manner of commercially available materials such as those described in the above-referenced Anderson patent. Thus, one terminal of each of the varistors 9–11 is electrically connected, respectively, by the conductors 17, 18 and 19, in common, to the terminal 15. The conductors 20, 21 and 22, respectively, connect the other ends of varistors 9–11 to the conductors 5–7 and thus to the motor windings 2–4.

The novel transient voltage surge suppressing circuit 8 shown in FIG. 1 operates to provide line-to-line and line-to-ground surge voltage protection for each of the windings 2–4 of motor 1. As indicated above in the discussion of the background of the present invention, this circuit arrangement makes it possible to utilize varistors that are substantially identical in their electrical characteristics, and which need have voltage ratings that are only about 2 percent greater than one-half the normal line voltage of motor 1. Due to the steeply non-linear characteristic of the metal oxide varistors and the floating common terminal 15 that allows the varistors to drop substantially equal voltages across the series-connected arrangements of the common varistor 12 and any one of the other varistors 9–11 for either a line-to-line or line-to-ground surge suppressing operation, only half of the normal line voltage, or any peak voltage, will appear across any of the varistors. Thus, none of the varistors 9–12 need have voltage or current ratings equivalent to the line voltage of the motor, as was common in prior art surge suppression circuits, but rather need only have voltage ratings equal to about half of the rated motor operating voltage. By reducing by approximately 50 percent the peak voltages to which any of the varistors in the circuit is subjected, the life of the system should be enhanced.

An equally important advantage of the novel combination of the present invention is that the accurately clamped protective level provided by the suppressing circuit for the motor windings 2–4 enables them to be adequately insulated with a relatively low voltage class of insulating material. Such a feature is particularly desirable, not only because of the saving in cost on insulating material, but because of the reduction in the space heretofore required to accommodate higher voltage classes of insulating material in such motors.

Although the preferred embodiment of the invention described above with reference to FIG. 1 is shown in relation to a polyphase motor having three line leads or terminals, it should be readily understood that the star configuration of the transient voltage suppressing circuit of the present invention is generally adaptable to any number of circuit leads, including the two leads of a single-phase circuit. In fact, for a motor having N leads, the star configuration of varistors, in combination with a common series varistor, pursuant to the circuit configuration of the present invention, would result in the use of N plus 1 varistors in total, with one of the varistors being connected between the common terminal of the star configuration and a ground terminal. From the description of the invention set forth thus far, it will be apparent that the desirable advantages and optimum operating characteristics of surge suppressing circuit 8 will not be lost or impaired if additional electric system components are connected to the terminals 5', 6' and 7', nor will the removal of motor 1 from the conductors' 5, 6 and 7 protective functions afforded by circuit 8. Furthermore, it can be seen that in the event one only desires to protect a single phase of an electrical system with the present invention, it is equally suited to that purpose. For example, if only lines 5 and 6 are to be protected, the varistor 11 could be removed or disconnected from the terminal 15, so that line-to-line and line-to-ground protection would be afforded by varistors 9 and 10 connected, respectively, in series with varistor 12. Since there are six line terminals 27'–32', a total of 6 plus 1, or seven varistors, is used in the transient voltage surge suppression circuit of the invention used to protect this particular motor. Thus, the varistors 33 through 38 are connected, respectively, by conductors 39–44 to the line terminals, and by conductors (unnumbered) at their opposite ends to common terminals 45. The common varistor 46 is electrically connected by conductors 47 and 48 between the common terminal 45 and a ground terminal 49.

Figure 2:
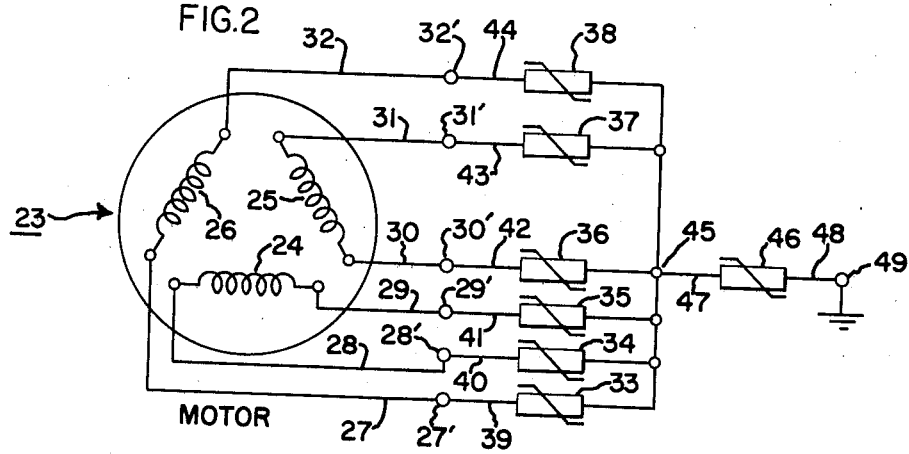
FIG. 2 is a schematic circuit diagram of a polyphase electric motor having six winding leads that may be connected to enable the motor to be operated for wye start-delta run operation, shown in combination with a transient voltage suppressing circuit constructed pursuant to the present invention.

It will be understood by those familiar with the motor art that the six-terminal independent motor winding arrangement shown in FIG. 2 is fairly commonly used for wye start-delta run or multi-speed motors; therefore, it will be recognized that the circuit combination depicted has considerable practical value because the number of varistors required with the present invention to provide line-to-line and line-to-ground surge voltage protection is approximately half the number of varistors required when using alternative surge protective circuits to provide similar protection. The operation of this embodiment of the invention is similar to that illustrated in FIG. 1 in that the common varistor 46 is always in series with one of the other varistors 33–38, whether a line-to-line or line-to-ground voltage surge is to be suppressed by the system. Accordingly, the advantages of possibly prolonged varistor life and reduced motor winding insulation ratings and winding insulation thickness are also afforded by this embodiment of the invention.

Those skilled in the art will recognize that various modifications and alternative forms of the invention may be developed from the description of it that is contained herein; accordingly, it is my intention to encompass within the following claims the true scope of my invention.

What I claim as new and desired to secure by Letters Patent of the United States of America is:

1. An electric distribution system having a plurality of electrical conductors equal in number to N that are to be protected from transient voltages, in combination with a transient voltage suppressing circuit comprising a plurality of metal oxide varistors equal in number to N plus 1, all but one of said varistors being connected in a star configuration with one of the respective terminals of each star-connected varistor being electrically connected in common, electric conductor means connecting each conductor, respectively, of the N conductors of the distribution system to an associated outer varistor terminal of the star configuration of varistors, the remaining varistor being electrically connected in series between the common connection of the star configuration of varistors and an electrical ground terminal, each of said varistors having substantially identical electrical characteristics.

2. An invention as defined in claim 1 wherein N equals 2.

3. An electric motor having a polyphase winding provided with a transient voltage suppressing circuit that enables the use of a relatively low voltage class of insulation on the windings, said voltage suppressing circuit comprising a plurality of metal oxide varistors electrically connected in a star configuration with one terminal of each varistor electrically connected in common, electric conductor means connecting each phase winding of the motor, respectively, to an associated outer terminal of the star configuration of varistors, and a common varistor electrically connected in series between the common connection of the star configuration and an electrical ground terminal, each of said varistors having substantially identical electrical operating characteristics.

4. An invention as defined in claim 3 wherein each of the varistors electrically connected in said star configuration comprises a single phase, dual terminal varistor.

5. An invention as defined in claim 3 wherein said polyphase winding is a wye-connected three-phase winding and the star configuration of varistors is also a wye connection having each of its outer terminals connected, respectively, to an outer terminal of the wye connected motor winding.

6. An invention as defined in claim 3 wherein said polyphase winding is a three-phase winding having two terminals on each winding that are selectively connectable to enable the motor winding to be connected with either a wye or delta winding, said electric conductor means being effective to connect each of said winding terminals to an associated outer terminal of the star configuration of varistors.

7. An invention as defined in claim 2 including a single-phase motor connected in operating relationship to the two conductors of said distribution system.

* * * * *